United States Patent [19]

Matsuo et al.

[11] Patent Number: 4,749,836

[45] Date of Patent: Jun. 7, 1988

[54] ELECTROMAGNETIC INDUCTION COOKING APPARATUS CAPABLE OF PROVIDING A SUBSTANTIALLY CONSTANT INPUT POWER

[75] Inventors: Katsuharu Matsuo, Aichi; Teruya Tanaka, Yokkaichi, both of Japan

[73] Assignee: Kabushiki Kaisha Toshiba, Kawasaki, Japan

[21] Appl. No.: 934,855

[22] Filed: Nov. 25, 1986

[30] Foreign Application Priority Data

Nov. 27, 1985 [JP] Japan .................................. 60-266631

[51] Int. Cl.⁴ .............................................. H05G 6/12
[52] U.S. Cl. ............................... 219/10.77; 219/10.79; 219/10.490
[58] Field of Search ................. 219/10.49 R, 10.77, 219/10.79, 10.75, 10.67, 506, 440–442

[56] References Cited

U.S. PATENT DOCUMENTS

| | | | |
|---|---|---|---|
| 4,115,677 | 9/1978 | Yamamura et al. | 219/10.77 |
| 4,280,038 | 7/1981 | Havas et al. | 219/10.77 |
| 4,464,553 | 8/1984 | Ikeda | 219/10.77 |
| 4,549,056 | 10/1985 | Okatsuka et al. | 219/10.77 |
| 4,595,814 | 6/1986 | Ogino et al. | 219/10.77 |

FOREIGN PATENT DOCUMENTS

| | | |
|---|---|---|
| 58-85293 | 5/1983 | Japan . |
| 59-49186 | 3/1984 | Japan . |
| 59-49189 | 3/1984 | Japan . |

*Primary Examiner*—M. H. Paschall
*Attorney, Agent, or Firm*—Cushman, Darby & Cushman

[57] ABSTRACT

An electromagnetic induction cooking apparatus having a heating coil, an inverter for supplying an input power to the coil, and a load-identifying circuit. The coil comprises two coils elements. The first coil elements has a first number ($N_1$) of turns, and the second coil element has a second number ($N_2$) of turns. The load-identifying circuit identifies the material of a load (e.g., a pan) and selects the first coil element or the second coil element in accordance with the material of the load. When the circuit selects the first coil element, a first DC voltage is applied to the inverter, and the inverter generates and supplies a first high-frequency current of frequency $f_1$ to the first coil element. When the circuit selects the second coil element, a second DC voltage is applied to the inverter, and the inverter generates and supplies a second high-frequency current of frequency $f_2$ to the second coil element. The ratio of $N_2$ to $N_1$ ($N_2/N_1$) is about four to six times the product of the ratio of $E_2$ to $E_1$ ($E_2/E_1$) and the $(-\frac{1}{2})$th power of the ratio of $f_2$ to $f_1$ ($f_2/f_1$).

14 Claims, 4 Drawing Sheets

ELECTROMAGNETIC INDUCTION COOKING APPARATUS CAPABLE OF PROVIDING A SUBSTANTIALLY CONSTANT INPUT POWER

BACKGROUND OF THE INVENTION

This invention relates to an electromagnetic induction cooking apparatus wherein a substantially constant input power can be supplied to an induction heating coil. More particularly, it relates to an electromagnetic induction cooking apparatus in which a high-frequency current is supplied to an induction heating coil, thereby generating and applying a high-frequency magnetic field to a cooking utensil such as a pan or a kettle, and thus generating an eddy current, whereby the cooking utensil generates heat for cooking due to a loss of eddy current. The input power to the heating coil control is controlled to be substantially constant, irrespective of the material of the cooking utensil.

The conventional electromagnetic induction cooking apparatus comprises a top plate, an induction heating coil and an inverter. The coil is provided below the top plate and constitutes a series LC resonant circuit. A pan (i.e., a load) can be put on the top plate. The inverter supplies the coil with a high-frequency current of 20 to 30 KHz. The coil generates and applies a high-frequency field to the pan placed on the top plate, whereby an eddy current flows in the pan, to thereby generate heat for cooking. The eddy current concentratedly flows through the induction heating coil due to the skin effect. Therefore, the eddy current depends largely on the skin resistance Rs of the pan. It also depends on the skin depth $\delta$ and the specific resistance $\rho$ of the pan material. The values of Rs and $\delta$ are given by $$\delta = (2 \cdot \rho/\omega \cdot \mu)^{\frac{1}{2}} \quad (1)$$
$$= \{1/(4\pi^2 \times 10^{-7})\}^{\frac{1}{2}} \times (\rho/f \cdot \mu s)^{\frac{1}{2}}$$

$$Rs = \rho/\delta = (\omega \cdot \mu \cdot \rho)^{\frac{1}{2}} \quad (2)$$
$$= (4\pi^2 \times 10^{-7})^{\frac{1}{2}} \times (\rho \cdot f \cdot \mu s)^{\frac{1}{2}}$$

Where "f" is frequency, and $\mu s$ is specific permeability. As seen from the equations (1) and (2), the skin depth $\delta$ and skin resistance Rs are determined by the specific resistance $\rho$ of the material and the specific permeability $\mu s$ of the pan.

The following talbe shows the values of $\rho$, $\mu s$, Rs and $\delta$ for materials of pans used in this kind of electromagnetic induction cooking apparatus.

When the material of the pan has a high permeability, like iron, the skin depth s is low, the skin effect is large, and the pan itself assumes a high resistance. As a result, the input impedance of the heating coil is high. When the pan is made of non-magnetic (18-8) stainless steel, its specific permeability $\mu s$ is low and 1, and therefore the skin depth $\delta$ must be small theoretically. However, because the thickness of an actual pan is small, the resistivity $\rho$ value is more effective. The resistance of the pan itself increases with this high resistivity $\rho$, and the input impedance of the heating coil increases.

As shown in the table above, in the case of aluminum or copper pans whose specific permeability and specific resistance are very small, the skin resistance is very small and the input impedance of the heating coil is small. Therefore, a large current such as short-circuit current flows, but the problem of inability to heat arises. In other words, if the pan material is aluminum or copper, the specific permeability $\mu s$ is 1 and is thus small. The skin depth $\delta$ is large, and the skin effect is difficult to produce. Especially the resistivity $\rho$ is also small. The pan itself will be of low resistance. As a result, the input impedance of the heating coil is decreased.

It is possible to further increase the frequency of the high frequency current, in order to solve this problem, but it would have to be increased up to several MHz. Also, this large an increase in the frequency is practically impossible, from the standpoint of the operating speed characteristics of the switching element of the inverter. Supposing that it were possible, since the frequency would be extremely high, the actual resistance caused by the skin effect in the inductance heating coil would be increased suddenly, and the problem of extremely reduced efficiency would arise.

In other words, in the case of a copper or aluminum pan, if the high-frequency field is intensified, the input impedance of the heating coil can be theoretically raised to a value approximately equal to a value resulting when an iron pan is used. Hence, the coil can heat the pan sufficiently. However, the frequency f of the high frequency magnetic field must be intensified several hundred times over that with an iron pan, and from the standpoint of the switching element used in the inverter, actual realization is very difficult. Specifically, the frequency of the magnetic field of an inductance heating cooker is an audible frequency of above 18 kHz. If this is the frequency of the high frequency magnetic field of an iron pan, if an aluminum or copper pan is to be used, a high-frequency magnetic field with a frequency as high as several MHz must be generated, and the increase of losses in the heating coil and the inverter is incurred.

|  | Pan Material Quality | | | |
|---|---|---|---|---|
| Characteristic Value | Iron | Non-magnetic Stainless steel | Aluminum | Copper |
| Specific Resistance $\rho(\Omega/m)$ | $17 \times 10^{-8}$ | $70 \times 10^{-8}$ | $2.8 \times 10^{-8}$ | $1.7 \times 10^{-8}$ |
| Specific Permeability $\mu s$ | 100 | 1 | 1 | 1 |
| Skin Resistance $Rs(\Omega)$ | $1.3 \times 10^{-3}$ | $0.27 \times 10^{-3}$ | $0.053 \times 10^{-3}$ | $0.041 \times 10^{-3}$ |
| Skin Depth $\delta(m)$ | $0.13 \times 10^{-3}$ | $2.6 \times 10^{-3}$ | $0.53 \times 10^{-3}$ | $0.41 \times 10^{-3}$ |

As seen from the table, the material of the pan, such as a ferromagnetic material with a high specific permeability, such as iron or magnetic stainless steel, or non-magnetic stainless steel with a high specific resistance, has a large skin resistance. Therefore, the heating coil has a large input impedance. In this respect, there is no problem in realizing the induction heating.

To qualitatively explain the above information, in a home use type electromagnetic induction heating cooker, in order that an input around 1.2 KW can be used, the switching element of the inverter must have a current capacity of several tens of amperes and a withstand voltage of several hundred volts. The time required for a switch element (transistor) to turn ON and OFF, that is to say, the accumulation time $t_{stg}$+fall time $t_f$, is about 1–2 μs, but the period for 1 MHz is 1 μs. In consideration of this fact, the construction of a multi-MHz inverter, as described above, is impossible.

When a high-frequency current flows in a heating coil made of copper wire, if the current density of the copper wire is uniform, the flux density at the center inside the copper wire increases. The longitudinal voltage distribution in the copper wire must be the same as the voltage distribution on the surface and at the center inside the copper wire. To make the longitudinal voltage distribution uniform, it is necessary for the flux density distribution to be uniform. Therefore, it is necessary to reduce the flux density in the center. This is the cause of the skin effect in the heating coil. When the copper element wire is twisted to form a coil, according to the same principle, the current inside the element wire becomes non-uniform due to the flux of other element wires. This is known as the "proximity effect." Accordingly, if the number of turns of the heating coil is increased, the losses that depend on the unit length of the heating coil increase.

For the above reasons, since the real resistance of the heating coil at high frequencies increases as the current frequency increases, the losses that occur in the heating coil increase. When the frequency is increased greatly, most of the inverter output power is consumed in the heating coil, power will not be applied to the pan, and the efficiency of the cooker will be very low. Also, the heating coil temperature will become very high becuase of the losses, and the problem of deterioration of the insulating covering of the copper wire will arise.

For the above reasons, the skin resistance of aluminum similarly can be increased by merely increasing the frequency of the heating coil.

The above approach, if taken to increase the input impedance of the heating coil, also increases the frequency and the skin resistance of the pan. There is another approach to increase the input impedance, however, in which the number of turns of the heating coil is increased. However, by simply doing this, the heating coil impedance is increased, and the resonant frequency is lowered. Therefore, in order to maintain the resonance of inverter load, which is composed of the heating coil and resonant condensers, the resonant frequency of the inverter must be lowered. When the frequency is lowered, not only does the skin resistance of the pan decrease, but the skin depth δ increases, and the problem that the input impedance of the heating coil changes occurs, depending on the thickness of the plate under the pan. In this case, with the frequency decrease, the skin resistance becomes still lower, and the number of turns of the heating coil must be increased further. As a result, the structure of the coil becomes even more complicated.

As shown above, with earlier techniques of making inductance heating cookers, the use of aluminum or copper pans to achieve the same efficiency and power input ultimately is impossible. The above facts thus show that there is no point in judging the pan material, based only on its magnetic or non-magnetic properties.

SUMMARY OF THE INVENTION

It is, therefore, an object of the present invention is to provide a new and improved electromagnetic induction cooking apparatus capable of providing a substantially constant input power to an induction heating coil, irrespective of the material used for the cooking utensil.

According to the present invention, there is provided an electromagnetic induction cooking apparatus capable of providing a substantially constant input power to an induction heating coil, comprising:

plate means on which a first or second cooking utensil is placed, the first cooking utensil being made of the material having relatively high specific permeability and/or specific resistance, and the second cooking utensil being made of the material having relatively low specific permeability or specific resistance;

DC power source means for applying a first DC voltage ($E_1$) or a second DC voltage ($E_2$);

inverter means for converting the first or second DC voltage applied from the DC power source means into first high-frequency current of frequency $f_1$ or second high-frequency current of frequency $f_2$;

first resonant circuit means for resonating with the first high frequency current supplied from the inverter means, to apply a high-frequency magnetic field to the first cooking utensil placed on the plate means, thereby to heat said first cooking utensil by the magnetic induction, the first resonant circuit means including first heating coil means of a predetermined number of turns ($N_1$) and first capacitor means of a predetermined capacitance ($C_1$);

second resonance circuit means for resonating with the second high-frequency current supplied from the inverter means, to apply a high-frequency magnetic field to the second cooking utensil placed on the plate means, thereby to heat said second cooking utensil by magnetic induction, the second resonant circuit means including second heating coil means of a predetermined number of turns ($N_2$) and second capacitor means of a predetermined capacitance ($C_2$);

current detection means for detecting the currents flowing through the first and second resonant circuit means; and select means coupled to said current detection means for receiving the current detection results from the current detection means, and determining that the first cooking utensil is placed on the plate means when said detection result is small, then causing the inverter means to produce a first high frequency current for setting the first resonant circuit means in a resonating mode, and determining that the second cooking utensil is placed on the plate means when said detection result is large, then causing the inverter means to produce a second high-frequency current, and setting the second resonant circuit means in a resonating mode, wherein a ratio ($N_2/N_1$) of number of turns $N_2$ to number of turns $N_1$ is about four to six times the product of a ratio ($E_2/E_1$) of voltage $E_2$ to voltage $E_1$ and the value obtained by raising a ratio ($f_2/f_1$) of the frequency $f_2$ with respect to frequency $f_1$ to the ($-\frac{1}{2}$)th power.

BRIEF DESCRIPTION OF THE DRAWINGS

These and other objects and features of the present invention can be understood through the following embodiments by reference to the accompanying drawings, in which.

DETAILED DESCRIPTION OF THE PREFERRED EMBODIMENTS

Figure 1:
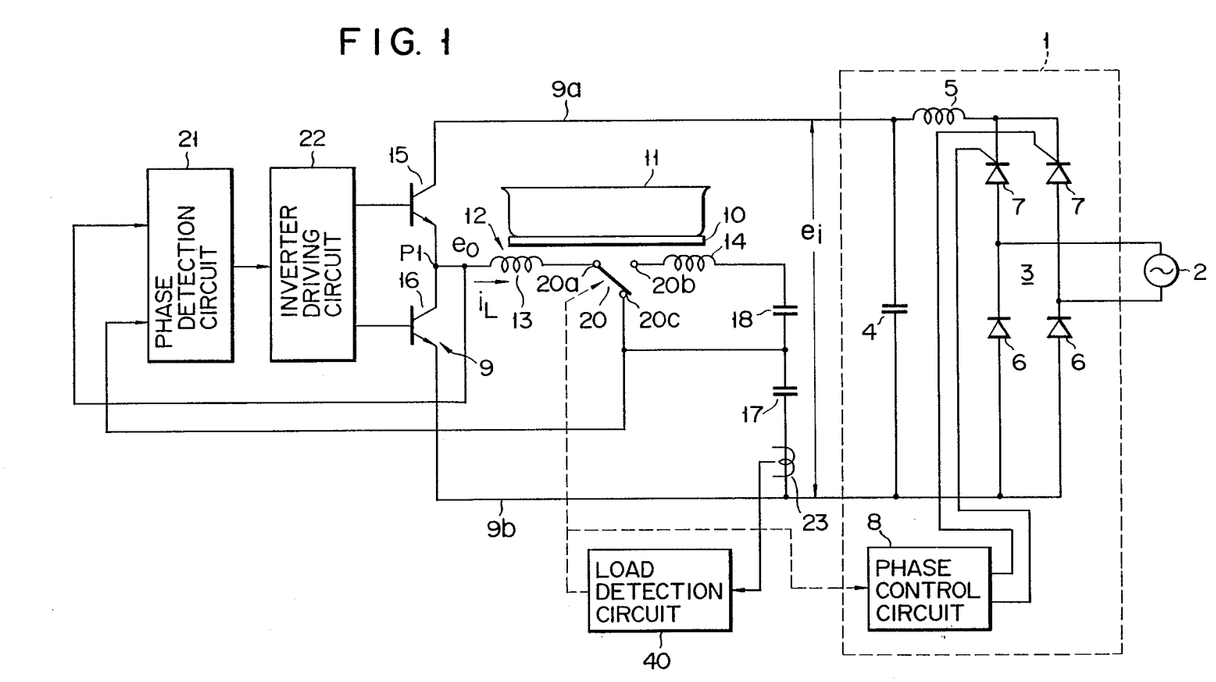
FIG. 1 shows a circuit diagram illustrating a first embodiment of an electromagnetic induction cooking apparatus according to this invention.
Figure 2:
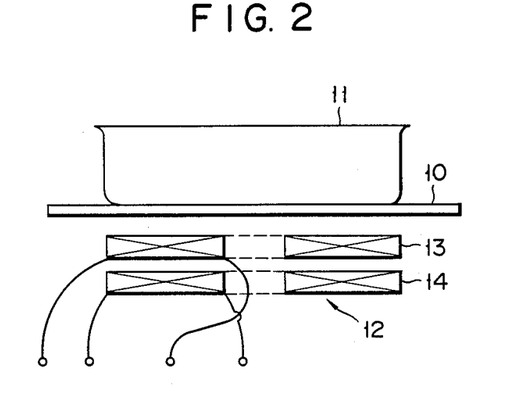
FIG. 2 shows a side view of the apparatus, which illustrates the layout of key components of the apparatus.

Embodiments of this invention will be described below, referring to the accompanying drawings. In FIG. 1, illustrating the first embodiment, reference numeral 1 designates a variable voltage type power supply device, which is composed of rectifier circuit 3, which receives AC power from a commercial power source 2 and converts it to DC power, smoothing capacitor 4, and choke coil 5. Rectifier circuit 3 is composed of two diodes 6 and two thyristors 7, which are connected in a bridge fashion. These thyristors 7 enable the input voltage ei between busses 9a and 9b, which connect power supply device 1 and inverter 9, to be varied through phase control by phase control circuit 8. Numeral 12, as shown also in FIG. 2 is an inductance heating coil providing inductance heating of pan 11, which is placed on the top of top plate 10. Coil 12 is composed of first coil 13 and second coil 14, so that the number of turns can be selected. These two coils are installed in two layers on the bottom side of top plate 10. The number of turns of the first coil 13 ($N_1$) is determined to be 20 turns, and the number of turns of second coil 14 ($N_2$) will also be 20 turns, so that when connected in series, a total of 40 turns will be provided.

This inductance coil 12, two switching transistors 15 and 16, first resonance capacitor 17 and second resonance capacitor 18 constitute a push-pull type, current resonance inverter 9. Numeral 40 represents a load detection circuit including output contact 20. Contact 20, when contact terminals 20a and 20b are connected, connects in series coils 13 and 14, and connects also in series these coils and resonance capacitors 17 and 18 between bus 9b and common connection point P1 of the emitter of transistor 15 and the collector of transistor 16 to set up a low skin resistance operation mode. When output contacts 20a and 20c are connected, on the other hand, inductance heating coil 13 and resonance capacitor 17 are connected in series between common connection point P1 and bus 9b, to set up a high skin resistance operation mode. Phase detection circuit 21 detects the phase between inverter output voltage $e_0$, or the voltage at common connection point P1 of switching transistors 14 and 16, and the current flowing through inductance heating coil 12 (coil 13 only, or both coils 13 and 14). Phase detection circuit 21, at the timing that causes the phase to always be 90°, alternately turns on and off switching transistors 15 and 16 of inverter 9, through inverter driving circuit 22. With this feature, the varying of the resonant frequency of inverter 9, caused by subtle differences in the material or mounting condition of pan 11, is prevented. The output from current transformer 23, which is in the current path of resonance capacitor 17, is applied to load detection circuit 40. This load detection circuit 40 identifies the material, or the skin resistance of pan 11 placed on top of top plate 10, on the basis of the value of high frequency current flowing through current transformer 23.

In this embodiment, $f_1$ is 20 kHz, and $f_2$ is 50 kHz. The turn ration is set within the range as defined by $(N_2/N_1) = K(f_2/f_1) - \frac{1}{4}$ (where K is between 4 and 6).

Next, the operation of the embodiment thus arranged will be explained. If pan 11 is made of a material such as iron with a high skin resistance, since the value of the current detected in current transformer 23 is small, load detection circuit 40 connects the output contact terminals 20a and 20c of output contact 20 and applies a voltage select signal to phase detection circuit 8. In response to this, coil 13 (20 turns) of inductance heating coil 12 will be selected, and resonance capacitor 17 will be selected. Also, thyristor 7 of rectifier circuit 3 will be phase controlled, and the input voltage ei of inverter 9 will be switched to $e_1$. ($e_1 > e_2$, and in this example $e_2 = e_1/2$). First and second switching transistors 15 and 16 will be turned on and off alternately. When switching transistor 15 is on, voltage is applied to coil 13 and first resonance capacitor 17. When switching transistor 16 is on, energy transfer occurs inside this LC circuit. Feedback control is active by phase detection circuit 21; inverter 9 is driven by frequency $f_1$; a high frequency current of frequency $f_1$, 20 kHz, flows in coil 13; and pan 11 is inductance heated.

When the contact terminals 20a and 20c of output contact 20 are connected, a pan 11 made of aluminum is placed on the top plate 10, and since its skin resistance is very small, the output of current transformer 23 will increase. Then load detection circuit 40 automatically drives output contact 20 to connect contact terminals 20a and 20b. Inverter output voltage ei will be switched from $e_1$ to $e_2$ (low voltage) by phase control circuit 8. Because of this, coils 13 and 14 will be connected in series, to have the number of turns $N_2$ (40 turns). Also, resonance capacitors 17 and 18 will be selected. As a result, inverter 9 will be driven at the higher frequency $f_2$ (50 kHz), which is higher than the frequency $f_1$, and will supply a high frequency current at frequency $f_2$ to inductance heating coil 12, and pan 11 will be inductance heated.

Next, the relation of turn ratio to frequency ratio and to input voltage ratio and their significance to this invention will be described. This invention has been made to keep constant the input power to the induction heating coil, irrespective of the selection of the input voltage, the number of turns of induction heating coil 12, and a value of the skin resistance of the pan, even when the skin resistance peculiar to pan 11 is different. In this case, pan 11 acts as a secondary coil, and its number of turns is considered to be 1.

Figure 3A:
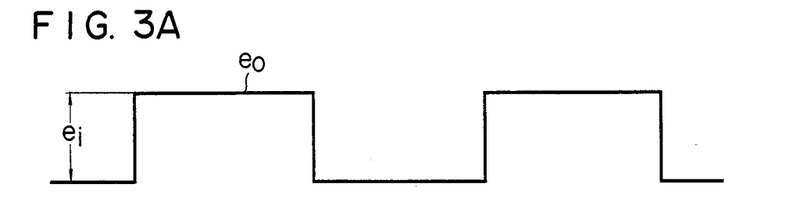
FIGS. 3A and 3B show waveforms of an input voltage and an input current to the apparatus.
Figure 3B:
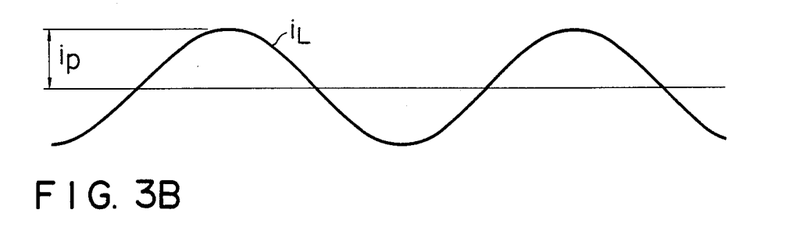

Next, the maintenance of almost equal values of the input power of inductance heating coil 12 of this electromagnetic induction cooking apparatus, even when the material of pan 11 is changed from iron, for example, to aluminum, with widely differing skin resistances, will be described. In FIGS. 3A and 3B, there are illustrated the waveforms of the input voltage ei and output voltage $e_0$ of inverter 9 (in this example, it is assumed that there is no voltage drop between the inverter input and output) and load current $i_L$. The input power Pai for one period $T_f$ of inverter 9 is given by $$Pai = 1/t_f \int_0^{t_f} ei \cdot i_L(t) dt \quad (3)$$

Where $$i_L(t) = i_p \sin \omega t$$

$$i_p = 1/R_L \cdot 2/\pi \cdot ei$$

$R_L$ is load resistance as seen from the input terminal of inductance heating coil 12.
Therefore:

$$Pai = \sqrt{2}/\pi \cdot ei^2/R_L. \quad (4)$$

The actual input power Pbi, when input voltage ei is not sufficiently smoothed and contains a ripple of the frequency of the commercial AC power, is given by the following equation:

$$\begin{aligned} Pbi &= 1/T \int_0^T Pai\, dt \\ &= \sqrt{2}/\pi \cdot 1/R_L \times 1/T \int_0^T ei^2 dt \\ &= \sqrt{2}/\pi \cdot Ei^2/R_L \end{aligned} \quad (5)$$

In the above equation, T is the period of the commercial power supply voltage, and Ei is the effective value of inverter input voltage ei. In the equations which will subsequently be described, the small numerals indicate the material of the pan 11; 1 stands for iron, and 2 stands for aluminum. When $Pi_1$ and $Pi_2$ are considered to be the input power when pan 11 is iron and aluminum, respectively, to keep the input power value constant, regardless of the material used, the values $Pi_1$ and $Pi_2$ must be equal. From the equation (5), we have $$Ei_2^2/R_{L2} = Ei_1^2/R_{L1}$$

Therefore:

$$R_{L2}/R_{L1} = (Ei_2/Ei_1)^2. \quad (6)$$

On the other hand, by using the equation (2) and $R_L = N^2 \cdot R_S$ (the transformer theory), the following equation holds:

$$(R_{L2}/R_{L1}) = (N_2/N_1)^2 \times (\rho_2 \cdot f_2 \cdot \mu s_2)^{\frac{1}{2}} \div (\rho_1 \cdot f_1 \cdot \mu s_1)^{\frac{1}{2}} \quad (7)$$

By arranging equations (6) and (7), we have $$\begin{aligned} N_2/N_1 &= \{(\rho_1 \cdot \mu s_1)/(\rho_2 \cdot \mu s_2)\}^{\frac{1}{4}} \times (Ei_2/Ei_1) \cdot (f_2/f_1)^{\frac{1}{4}} \\ &= K(Ei_2/Ei_1)(f_2/f_1)^{\frac{1}{4}} \end{aligned} \quad (8)$$

where $$K = \{(\rho_1 \cdot \mu s_1)/(\rho_2 \cdot \mu s_2)\}^{\frac{1}{4}}.$$

Equation (8) shows that if the turn ratio ($N_2/N_1$) of the inductance heating coil 12 is proportional to the product of the frequency ratio ($f_2/f_1$) to the ($-\frac{1}{4}$) power and the ratio of the effective value of inverter input voltage ($Ei_2/Ei_1$), the input power of inductance heating coil 8 will remain the same, regardless of whether the material of pan 11 is of iron or aluminum, or whether the specific skin resistances differ. Also, equation (8) indicates that turn ratio ($N_2/N_1$) can make constant the input power of the inductance heating coil 12 regardless of the difference of skin resistances by being set to a small value by changing the effective value (Ei) of the inverter input voltage simultaneously. For instance, supposing that $f_1 = 20$ kHz, $f_2 = 50$ kHz, $N_1 = 20$, $K = 4.8$, and voltage ratio ($Ei_1/Ei_2$) is 1, then $N_2 = 80$. If this voltage ratio is halved, $N_2$ is reduced to 40. With this reduction of $N_2$, the construction of the inductance heating coil 12 is made simpler.

K is a constant determined by the pan material. The pans used in the usual household can be divided into two classifications: iron or stainless steel with high skin resistance, and aluminum or copper with low skin resistance. If the case of iron or aluminum, the value of K, if actually measured, is 4 to 6. As an example, if the leakage flux ratios of aluminum and iron are considered to be equal, if $\rho_1 = 10 \times 10^{-8}$ (ohm/m), $\rho_2 = 2.75 \times 10^{-8}$ (ohm/m), $\mu s_1 = 200$, $\mu s_2 = 1$, and the equation (8) is used to calculate the value of K, then $K = 5.2$, which agrees roughly with the actual measured value.

The difference of K in the low skin resistance classification or the high skin resistance classification is so minimal that the difference in input power caused by this skin resistance difference can be compensated for by the ON/OFF control of the input current.

Figure 4:
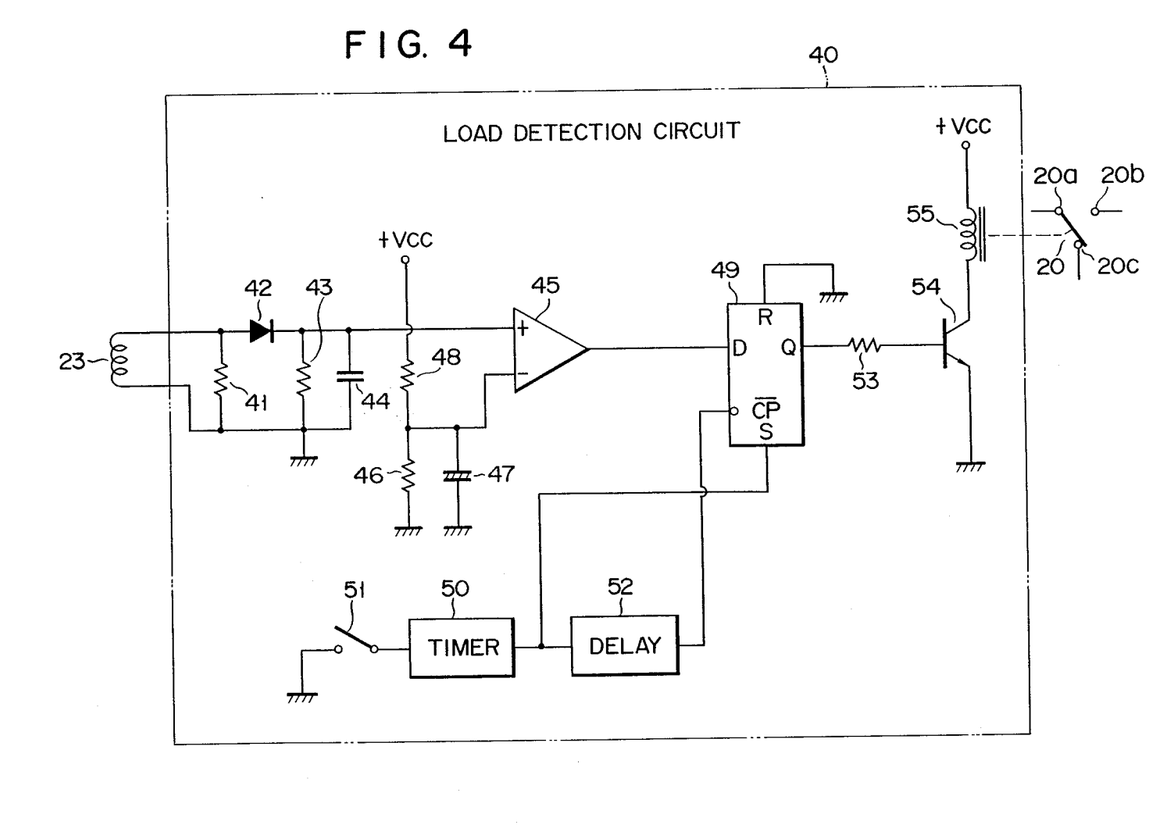
FIG. 4 is a circuit diagram of a load detection circuit used in the induction cooking apparatus.

FIG. 4 is an example of load detection circuit 40, as used in the embodiment described above.

Resistor 41 is connected to the output terminals of current transformer 23. The voltage across this resistor 41 is applied to the parallel circuit of resistor 43 and capacitor 44 via diode 42. The voltage appearing in this parallel circuit is supplied to the non-inverting input terminal (+) of comparator 45. Also, a DC voltage Vcc is applied to the parallel circuit of resistor 46 and capacitor 47 via resistor 48. The voltage from this parallel circuit is supplied to the inverting input terminal (−) of comparator 45. The output of comparator 45 is fed to the D input terminal of flip-flop circuit 49. Numeral 50 is a timer circuit, which starts operating an output logic "1" level for only a fixed time when switch 51, which is coupled with the cooker start switch (not shown), is turned on. The output of timer circuit 50 is supplied to the S input terminal of flip-flop circuit 49, and also to the CP (clock pulse) input terminal of flip-flop circuit 49. The output of flip-flop circuit 49 is applied between the base-emitter path of NPN transistor 54 via resistor 53. DC voltage Vcc is supplied to relay 55, via the collector-emitter path of transistor 54.

The operation of the load detection circuit thus arranged will be described.

The input impedance of the heating coil is proportional to the square of the number of turns of the heating coil. Therefore, if the pan material is of aluminum or copper, heat cooking can be performed in the same way as for pans made of iron or 18-8 stainless steel by increasing the number of turns of the heating coil to make the input impedance of the heating coil higher.

Actually, in the case of aluminum or copper, because the permeability is low, the leakage flux of the heating coil becomes larger, and the increased number of turns, as mentioned above, causes the input impedance to be larger than that when iron is used. As a result, heating becomes difficult. The resonant frequency $f_0$ of the resonant circuit is given by:

$$f_0 = 1/2\pi\sqrt{Lc \cdot Cr}$$

In the above equation, Lc is the input inductance of the heating coil, and Cr is the capacity of the resonance capacitor. If the input inductance Lc of the heating coil is increased, the resonant frequency $f_0$ becomes higher, and the high frequency maganetic field generated becomes higher. Therefore, if only the number of turns of the heating coil is increased, losses become higher as described in the explanation of the conventional device, and the heating process becomes difficult.

To cope with this difficulty, if the capacitance of the resonance capacitor is reduced, as well as the increase in the number of turns of the heating coil, the increase of resonance frequency $f_0$ can be prevented, and constant heating with aluminum, copper, iron or 18-8 stainless steel pans becomes possible.

Pan 11 is placed on top of top plate 10, and current is applied. When the cooker switch is turned on, switch 51, which is coupled with it, is also turned on, and timer circuit 50 operates. Since timer circuit 50 first outputs a logic "1" level signal, flip-flop circuit 49 outputs a logic "1" level signal, and relay 55 is operated. When relay 55 is operated, the normally open circuit between contact terminals 20a and 20b is closed. Because of this, coils 13 and 14 of the heating coil, providing a large number of turns, and resonance capacitors 17 and 18 (in series), providing a small capacitance, comprise the series resonant circuit.

In the response to the turning on the cooker switch, inverter driving circuit 22 operates, transistors 13 and 14 will be turned ON and OFF alternately, and a high frequency current flows in heating coils 13 and 14. This high frequency current is detected in current transformer 23, and based on this detected current value, load detection circuit 40 determines the input impedance of the heating coil. In this case, if the high frequency current flowing in the heating coil is large, the output of comparator 45 will be at logic "1". In other words, if the input impedance of the heating coil is low, especially if the pan material is of low permeability, load detection circuit 40 determines that the material is either aluminum or copper. Later, timer circuit 50 times a fixed time period, and its output change to logic "0". A negative edge pulse thus is generated in the output of delay circuit 52. At this time, because the D input signal of flip-flop circuit 49 (output of comparator 45) is logic "1" level, the Q output is held at logic "1". The operation of relay 55 is continued; the normally open circuit between contact terminals 20a and 20b remains closed; and the resonant circuit oscillation of the circuit, composed of coils 13 and 14 of the heating coil, and resonance capacitors 17 and 18, continues. In other words, the input impedance of the heating coil is forced to remain at its high setting. Thus, since the input impedance of the heating coil is high, and the capacity of the resonance capacitor is low, pan 11 can be heated without the occurrence of losses.

When heating is begun, if the high frequency current flowing in the heating coil is small, the output of comparator 45 is logic "0". Then, load detection circuit 40 determines that the pan material is either high-permeability, high-resistance iron or low-permeability, high-resistance 18-8 stainless steel. After that, timer circuit 50 counts a fixed time period, and its output is logic "0". When a negative edge pulse is generated at the output of delay circuit 52, the D input of flip-flop circuit 49 is logic "0", and the output terminal Q is logic "0". As a result, the operation of relay 55 is stopped, and the normally closed circuit between contact terminals 20a and 20c is closed. Thus, series resonant circuit now consists of coil 13 only (small number of turns), and resonance capacitor 17 (large capacity), and pan 11 is inductance heated to a degree based on the high frequency magnetic field emitted from the heating coil.

When cooking with heat, the phase of the high frequency current flowing in the resonant circuit is detected by phase detection circuit 21. The ON/OFF timing of transistors 15 and 16 is controlled in accordance with the results of this detection, and stabilized oscillation of the resonant circuit is achieved.

In this way, when heating has started, load detection circuit 40 determines that the material of pan 11 is either aluminum or copper, when the input impedance of the heating coil is low. Then the input impedance of the heating coil is forced higher (and the capacity of the resonance capacitor is reduced), and cooking by heat is achieved. Therefore, efficient cooking with heat without heat losses can be performed with a pan made of iron or 18-8 stainless steel, or one made of aluminum or copper.

Figure 5:
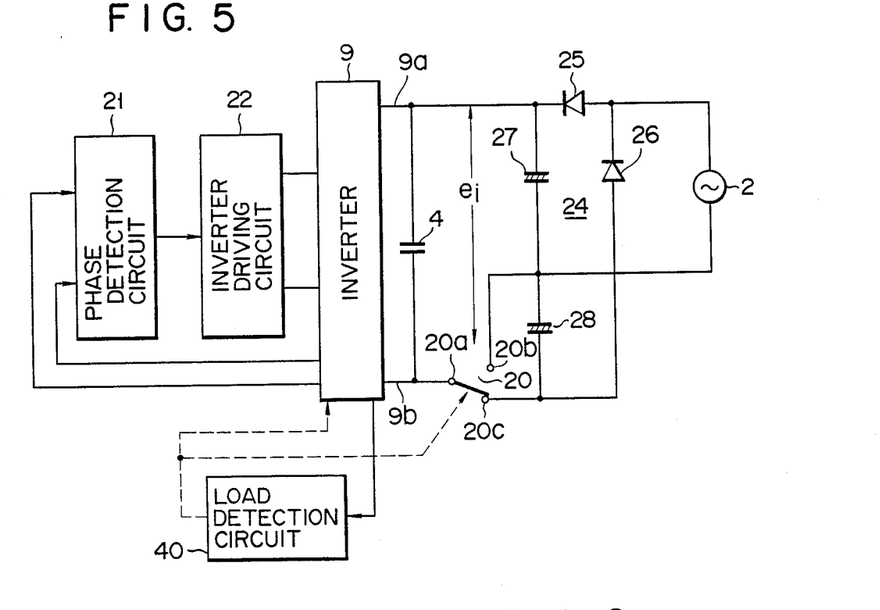
FIG. 5 is a circuit diagram of a second embodiment of an induction cooking apparatus according to this invention.
Figure 6:
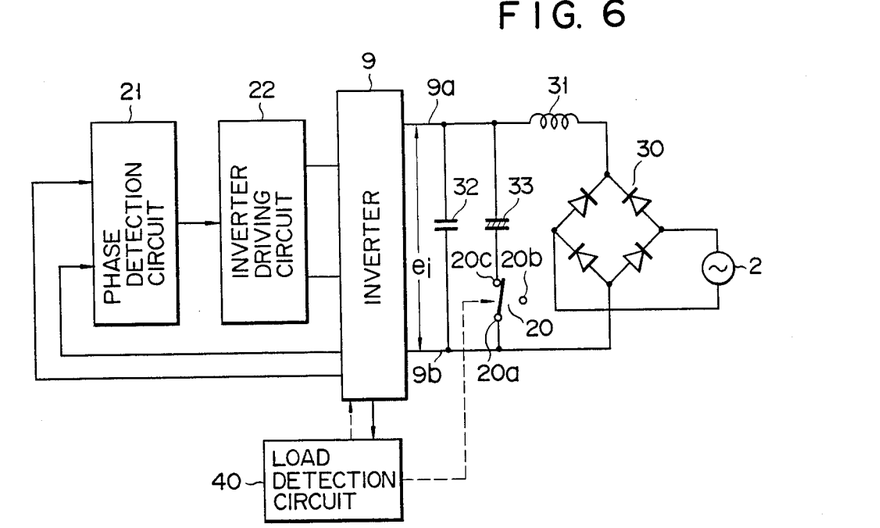
FIG. 6 is a circuit diagram of a third embodiment of an induction cooking apparatus according to this invention.

FIGS. 5 and 6 show examples of the second and third embodiments of this invention, in which the power supply circuit configuration is different from that of power supply 1 of FIG. 1, but in which the other components use the same configuration, and are designated by the same numbers. FIG. 5 is a voltage doubler type rectifier circuit 24 composed of diodes 25 and 26, and capacitors 27 and 28. It is constructed so that, when contact terminals 20a and 20c are connected (ON), if $ei = e$, and if contact terminals 20a and 20b are connected (ON), then $ei = e/2$.

The power supply device of FIG. 6 is composed of full-wave rectifier circuit 30, filter reactor 31, and 1st and 2nd filter capacitors 32 and 33. It is constructed so that if inverter input voltage ei is e when contact terminals 20a and 20c are not connected, $ei = e$, and when 20a and 20c are connected, $ei = e\sqrt{2}$.

The use of this invention is not limited to the embodiments described above. Especially, in the above embodiments, the inductance heating coil and the resonance capacitors are used as components of the inverter, but a variable frequency type inverter that is completely independent from the inductance heating coil and the resonance capacitors can be used.

In this invention, the frequency of the high frequency current supplied to the inductance heating coil, in accordance with the material of the load, which is the cooking vessel, such as a pan, can be switched between $f_1$ and $f_2$; the number of turns can be switched between $N_1$ and $N_2$; and the effective value of the inverter input voltage can be switched between $E_1$ and $E_2$. All these switching operations are done simultaneously, and the relation $(N_2/N_1) = K(E_2/E_1)(f_2/f_1)^{-\frac{1}{4}}$ is satisfied over the range in which K is more than 4, but less than 6. Thus, the variation of the input power of the inductance heating coil, due to the difference in skin resistance between different pans, almost disappears completely, and regardless of the material used in the pan, efficient induction heating can be obtained.

With this invention, even if the pan is made of material which has low specific permeability and specific resistance, an excessive current condition will not occur, and conductance heating can be done without difficulty with an input current which is almost the same as that when a material such as iron is used. Thus, there is no need for an extreme increase in frequency, and the resulting decrease of efficiency, and an electromagnetic induction cooking apparatus with a simplified inductance heating coil construction is offered.

What is claimed is:

1. An electromagnetic induction cooking apparatus wherein a substantially constant input power is supplied to an induction heating coil, said apparatus comprising:

plate means on which a first or second cooking utensil is placed, said first cooking utensil being made of a material having relatively high specific permeability and/or specific resistance, and said second cooking utensil being made of a material having relatively low specific permeability or specific resistance;

DC power source means for applying a first DC voltage ($E_1$) or a second DC voltage ($E_2$);

inverter means for converting said first or second DC voltage applied from said DC power source means into first high-frequency current of frequency $f_1$ or second high frequency current of frequency $f_2$;

first resonant circuit means for resonating with said first high-frequency current supplied from said inverter means, to apply a high frequency magnetic field to said first cooking utensil selectively placed on said plate means, thereby heating said first cooking utensil by magnetic induction, said first resonant circuit means including first heating coil means of a predetermined number of turns ($N_1$) and first capacitor means of a predetermined capacitance ($C_1$);

second resonant circuit means for resonating with said second high-frequency current supplied from said inverter means, to apply a high-frequency magnetic field to said second cooking utensil placed on said plate means, thereby heating said second cooking utensil by magnetic induction, said second resonant circuit means including second heating coil means of a predetermined number of turns ($N_2$) and second capacitor means of a predetermined capacitance ($C_2$), a ratio ($N_2/N_1$) of the number of turns $N_2$ to the number of turns $N_1$ being about four to six times the product of a ratio ($E_2/E_1$) of DC voltage $E_2$ to DC voltage $E_1$ and the value obtained by raising a ratio ($f_2/f_1$) of said frequency $f_2$ to said frequency $f_1$ to the $(-\frac{1}{2})$th power;

current detection means for detecting the currents flowing through said first and second resonant circuit means; and select means, coupled to said current detection means, for receiving the current detection results from said current detection means, for determining that said first cooking utensil is placed on said plate means when said detection result is small, then causing said inverter means to produce a first high-frequency current and setting said first resonant circuit means in a resonating mode, and for determining that said second cooking utensil is placed on said plate means when said detection result is large, then causing said inverter means to produce a second high-frequency current and setting said second resonant circuit means in a resonating mode.

2. An electromagnetic induction cooking apparatus according to claim 1, wherein said frequency $f_1$ is 20 kHz and said frequency $f_2$ is 50 kHz.

3. An electromagnetic induction cooking apparatus according to claim 1, wherein said ratio ($E_2/E_1$) is $\frac{1}{2}$.

4. An electromagnetic cooking apparatus according to claim 3, wherein said number of turns ($N_1$) is 20 and said number of turns $N_2$ is 40.

5. An electromagnetic induction cooking apparatus according to claim 1, wherein said DC power source means includes a rectifier circuit having at least thyristors and a phase control circuit coupled with said thyristors.

6. An electromagnetic induction cooking apparatus according to claim 1, wherein said DC power source means includes a voltage doubler type rectifier circuit for producing a predetermined voltage and its doubled voltage.

7. An electromagnetic induction cooking apparatus according to claim 1, wherein said DC power source means includes a rectifier circuit to producing a voltage and its $\sqrt{2}$ times voltage.

8. An electromagnetic induction cooking apparatus wherein a substantially constant input power is supplied to an induction heating coil, said apparatus comprising:

plate means on which a first or second cooking utensil is placed, said first cooking utensil being made of a material having relatively high specific permeability and/or specific resistance, and said second cooking utensil being made of a material having relatively low specific permeability or specific resistance;

DC power source means for applying a first DC voltage ($E_1$) or a second DC voltage ($E_2$);

inverter means for converting said first or second DC voltage applied from said DC power source means into first high-frequency current of frequency $f_1$ or second high-frequency current of frequency $f_2$;

a first heating coil located under said plate means, and having a first number of turns ($N_1$), one end of said first heating coil being connected to an output terminal of said inverter means;

an output contact having a first contact terminal connected to the other end of said first heating coil, and second and third contact terminals being selectively closed so as to be connected to said first contact terminal;

a second heating coil located under said plate means and connected at one end to said second contact terminal of said output contact, said second heating coil having a second number of turns ($N_2$) when said second heating coil is connected in series to said first heating coil, said second number of turns ($N_2$) including said first number of turns ($N_1$), a ratio ($N_2/N_1$) of said second number ($N_2$) of turns to said first number ($N_1$) of turns being about four to six times the product of a ratio ($E_2/E_1$) of said DC voltage $E_2$ to said DC voltage $E_1$ and the value obtained by raising a ratio of said frequency $f_2$ to said frequency $f_1$ to the $(-\frac{1}{2})$th power;

a first capacitor connected between said third contact terminal of said output contact and a reference potential point, said first capacitor being set to such a value that, when the first and third contact terminals of said output contact are closed, said first capacitor is combined with said first heating coil to resonate at the frequency of said first high frequency current $f_1$ supplied from said inverter means;

a second capacitor connected between the end of said second heating coil and said third contact terminal of said output terminal, and said second capacitor being set to such value that, when the first and second contact terminals of said output contact are closed, said second capacitor is combined with said first capacitor and said first and second heating coils to resonate at the frequency of said second high frequency current $f_2$ supplied from said inverter means;

current transformer means coupled with a current path common to said first and second capacitors; and select means, coupled with said current transformer, for receiving an output signal from said current transformer, for causing said DC power source means to produce a first DC voltage when the output of said current transformer is small, then closing the path between the first and third contact terminals and causing said inverter means to produce a first high-frequency current, and for causing said DC power source means to produce a second DC voltage when the output of said current transformer is large, then closing the path between the first and second contact terminals and causing said inverter means to produce a second high-frequency current from said inverter means.

9. An electromagnetic induction cooking apparatus according to claim 8, wherein said frequency $f_1$ is 20 kHz and said frequency $f_2$ is 50 kHz.

10. An electromagnetic induction cooking apparatus according to claim 8, wherein said ratio ($E_2/E_1$) is ½.

11. An electromagnetic induction cooking apparatus according to claim 10, wherein said number of turns $N_1$ is 20 and said number of turns $N_2$ is 40.

12. An electromagnetic induction cooking apparatus according to claim 8, wherein said DC power source means includes a rectifier circuit having at least thyristors and a phase control circuit coupled with said thyristors.

13. An electromagnetic induction cooking apparatus according to claim 8, wherein said DC power source means includes a voltage doubler type rectifier circuit for producing a predetermined voltage and its doubled voltage.

14. An electromagnetic induction cooking apparatus according to claim 8, wherein said DC power source means includes a rectifier circuit for producing a voltage and its $\sqrt{2}$ times voltage.

* * * * *